United States Patent Office 3,333,271
Patented July 25, 1967

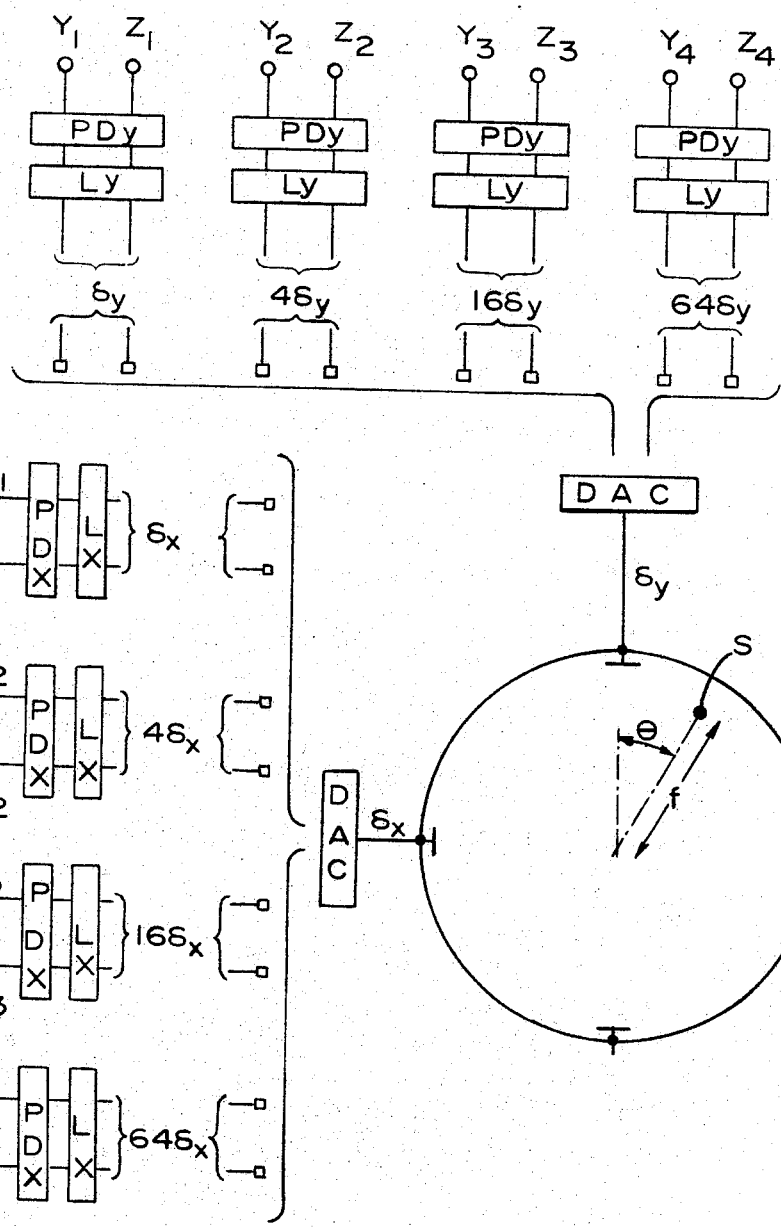

3,333,271
BEARING AND FREQUENCY MEASURING SYSTEM
Stephen Joseph Robinson, Reigate, Ralph Levy, Leeds, and Robert Nicholas Alcock, Ewell, England, assignors to North American Philips Company, Inc., New York, N.Y.
Filed Sept. 16, 1965, Ser. No. 487,768
5 Claims. (Cl. 343—113)

ABSTRACT OF THE DISCLOSURE

A system for determining the bearing and frequency of a distant transmitter comprises an antenna system of two orthogonal linear arrays. Each array comprises at least one pair of antennas. Means are provided to produce a signal corresponding to the phase difference of each pair of antennas, and logic circuits are provided to provide an output corresponding to a vector having an amplitude proportional to frequency and an argument proportional to bearing. The resolution of the system may be increased by adding additional pairs of antennas to each array of predetermined spacings.

---

This invention relates to a system for giving simultaneous indications of the bearing of a distant transmitter together with the frequency of the radio-frequency energy radiated by the transmitter.

The system is capable of providing an analogue read out, preferably on a cathode-ray tube, but if required it may be adapted to provide information in digital form.

The present invention provides a system for simultaneously measuring the bearing of a distant transmitter together with the frequency of the radio-frequency energy radiated by the transmitter, comprising an antenna arrangement in the form of two linear aerial arrays arranged orthogonally to each other, means for measuring in each array the phase-difference angle of the signals induced in two of its aerials by the incident energy, and means for deriving from such measurement two signals representing mutually-perpendicular co-ordinates of a vector having an amplitude proportional to the frequency of the incident energy and having an argument representing the angle of incidence on the antenna arrangement of the said energy.

Preferably, each antenna array comprises a pair of antennas spaced from each other by a distance $d$, the system being operative to derive from one array a signal representing a phase-difference angle $\delta_x$ of the form $kf \sin \theta$ and to derive from other array a signal representing a second phase-difference angle $\delta_y$ of the form $kf \cos \theta$ wherein the two signals $\delta_x$ and $\delta_y$ represent the said two mutually-perpendicular co-ordinates, wherein $\theta$ is the said angle of incidence
$f$ is the frequency of the incident energy $$k = \frac{2\pi d}{c}$$

and $c$ is the velocity of propagation of the energy
and wherein the distance $d$ is not greater than half a wavelength at a frequency measurable by the system.

Figure 1:
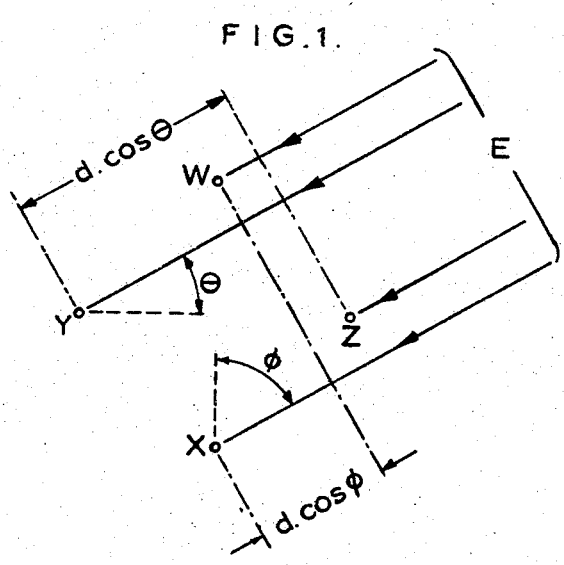
Figure 2:
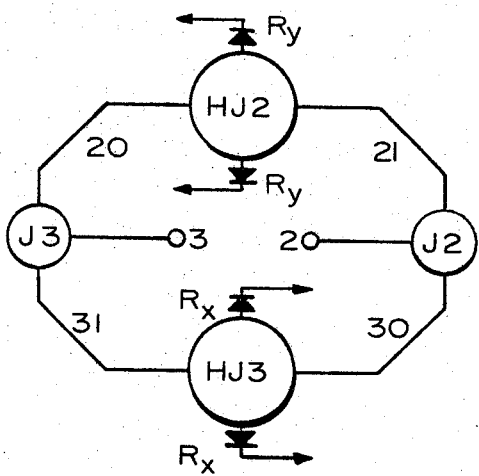
Figure 3:
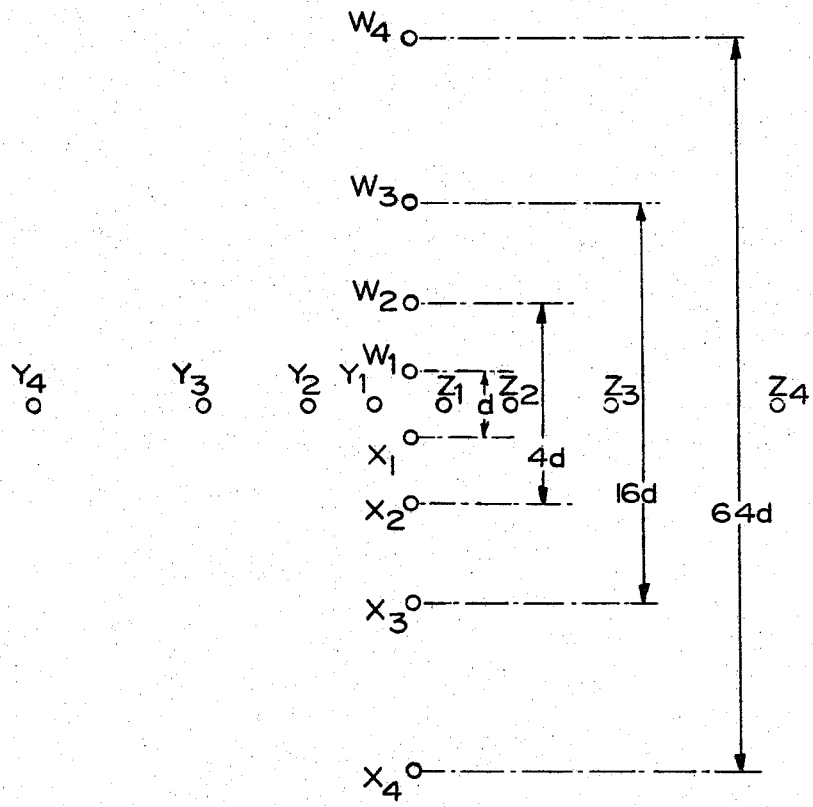

An embodiment of the invention will now be described, by way of example, with reference to the accompanying diagrammatic drawings wherein:

FIGURE 1 illustrates an antenna arrangement,
FIGURE 2 illustrates a phase-discriminator,
FIGURE 3 illustrates a further antenna arrangement, and
FIGURE 4 illustrates a complete system.

Referring to FIGURE 1 an antenna arrangement comprises two orthogonal arrays one of which comprises aerials W and X and the other of which comprises antennas Y and Z. Each antenna in this arrangement is preferably in the form of a vertical conductor. If we now consider a wave E of frequency $f$ incident upon this antenna system then, as is well known, we may indicate in the aerial system W, X a difference in path length between the signals incident upon two antennas by the expression $d \cos \phi$ where $d$ is the distance between antennas W and X. The phase difference $\delta_x$ between the signals in the two antennas will the be:

$$\delta_x = \frac{2\pi d}{\lambda} \cos \phi$$

Similarly, in antennas Y and Z the difference in path length is $d \cos \phi$ and the phase difference $\delta_y$ is:

$$\delta_y = \frac{2\pi d}{\lambda} \cos \theta$$

Because $\phi + \theta = \pi/2$, and if we introduce a constant $k$ equal to $$\frac{2\pi d}{c}$$

where $c$ is the velocity of propagation, we can write:

$$\delta_x = kf \sin \theta$$

and $$\delta_y = kf \cos \theta \qquad (i)$$

The phase differences $\delta_x$ and $\delta_y$ can each be measured by feeding signals from the appropriate pair of antennas W, X or Y, Z, into the input arms of a phase-discriminator illustrated in FIGURE 2. This discriminator comprises three-port junctions J2 and J3 and four-port hybrid junction HJ2 and HJ3: the lines 20 and 30 are of equal length while the lines 21 and 31 differ therefrom by a length equal to a quarter wavelength at the mid-band frequency of the apparatus. If signals differing in phase by $\delta_x$ are applied to the input terminals 2 and 3 of the discriminator then the output from square-law detectors $R_x$ will be proportional to $\cos \delta_x$ and the output from square-law detector $R_y$ will be proportional to $\sin \delta_x$. The junctions J2 and J3 may also be hybrid junctions.

Now consider the addition of further pairs of antennas on the W–X axis with spacings of $4d$, $16d$, and $64d$, respectively. Let each pair feed a phase-discriminator, to give output signals proportional to $\cos 4\delta_x$ and $\sin 4\delta_x$ $\cos 16\delta_x$ and $\sin 16\delta_x$, and $\cos 64\delta_x$ and $\sin 64\delta_x$ respectively. With the aid of a goniometer system the signs of these signals are recorded in digital form. This means that provided $\delta_x$ does not take values outside the range $\pm 180°$ (when ambiguities would occur) the $\delta_x$ can be measured to an accuracy of 1 part in 256, by eight binary digits. Referring to Equation i, it is seen that the condition for $\delta_x$ to be single-valued is that $d$ must not be greater than half a wavelength at the highest frequency in the band.

A similar set of antennas along the Y–Z axis can be used to record $\delta_y$ in digtal form so that $\delta_x$ and $\delta_y$ become the $x$ and $y$ co-ordinates of a vector of amplitude $kf$ and argument $\theta$, so that standard methods of vector resolution can be employed to obtain the frequency and bearing independently.

FIGURE 3, which for an obvious reason is not drawn to scale, shows the complete antenna arrangement comprising four pairs of antennas W, X, and four pairs of aerials Y, Z.

Consider now such an antenna system feeding a digital and read-out apparatus to produce output digits representing $\delta_x$ and $\delta_y$. If these two digital outputs from each antenna pair are applied to a digital to-analogue converter and the signals at the output of the converter are applied to orthogonal plates of a cathode-ray tube as illustrated in FIGURE 4; the resultant display will be in the form of a spot which will be linearly displaced from the central position 0 of the tube screen by a distance proportional to $f$ and which will be angularly displaced from a previously-determined datum line by an angle $\theta$. Thus, the frequency of the transmitted signal can be indicated by what suitably may be termed the "radial displacement" of the spot, while the bearing of the transmitter can be measured, for example, with the aid of an angular scale around the tube.

FIGURE 4 shows an arrangement of antennas, phase-discriminators and logic circuits referred to above. Each pair of antennas in the Y–Z array feeds one of a chain of phase-discriminators PD$y$, such as illustrated in FIGURE 2, and each pair of antennas in the W–X array feeds one of a chain of similar phase-discriminators PD$x$; the two outputs from each phase-discriminator PD$y$ are applied to a logic circuit L$y$ and the two outputs from each phase-discriminator PD$x$ are applied to a logic circuit L$x$. The chain of logic circuits L$x$ functions to produce binary digit indications of the quadrants, of a Cartesian graph, in which the phase-angles $\delta_x$, $4\delta_x$, $16\delta_x$ and $64\delta_x$ terminate, and thus serves to indicate in binary form and with successive degrees of accuracy the value of $\delta_x$. The chain of logic circuits L$y$ functions in a similar manner to produce binary digit indications relative to the phase-angle $\delta_y$, $4\delta_y$, $16\delta_y$ and $64\delta_y$ and thus to indicate the value $\delta_y$.

The binary digits from the Y–Z array thus indicate $\delta_y$ and the binary digits from the W–X array similarly indicate $\delta_x$. Each of these indications can now be applied to digital-to-analogue converter DAC so as to obtain at the outputs of the two converters analogue representations of $\delta_y$ and $\delta_x$.

Now it has been shown from Equation i that $\delta_y$ and $\delta_x$ are the $x$ and $y$ co-ordinates of a vector of amplitude $kf$ and argument $\theta$, so that if they are applied orthogonally to the deflection plates of a cathode-ray tube then the result will be to deflect a spot S from its normal position at the centre of the tube; this deflection will be displaced from a suitably-chosen datum direction by the angle $\theta$ and the radial displacement of the spot will be proportional to the frequency $f$ of the received signal.

What we claim is:

1. A system for simultaneously measuring the bearing of a distant transmitter and the frequency of the radio-frequency energy radiated by the transmitter, comprising an antenna arrangement in the form of two linear antenna arrays arranged orthogonally to each other, means for measuring in each array the phase-difference angle of the signals induced in two of its antennas by the incident energy, and means for deriving from the output of said means for measuring two signals corresponding to mutually-perpendicular coordinates of a vector having a magnitude proportional to the frequency of the incident energy and having an argument representing the angle of incidence on the antenna arrangement of the said energy.

2. A system as claimed in claim 1 wherein each antenna array comprises a pair of antennas spaced from each other by a distance $d$, wherein said means for deriving comprises means to derive from one array a signal representing a phase-difference angle $\delta_x$ of the form $kf \sin \theta$ and to derive from the other array a signal representing a second phase-difference angle $\delta_y$ of the form $kf \cos \theta$, wherein the two signals $\delta_x$ and $\delta_y$ represent the said two mutually-perpendicular co-ordinates, wherein $\theta$ is the said angle of incidence
$f$ is the frequency of the incident energy $$k = \frac{2\pi d}{c}$$

and $c$ is the velocity of propagation of the energy
and wherein the distance $d$ is not greater than half a wave-length at a frequency measurable by the system.

3. A system as claimed in claim 2 wherein each antenna array comprises $m$ pairs of antennas, wherein spacings of the antennas constituting the pairs are $d$, $4d$, $16d \ldots (4^{m-1}.d)$, comprising a plurality of phase discriminators, means for applying the two signals from the pair of antennas spaced $d$ in one array to one of said phase-discriminators for deriving two angle-indicating unidirectional signals having magnitudes respectively proportional to $\cos \delta_x$ and $\sin \delta_x$, means applying two signals from the pair of antennas spaced $4d$ in the same array to another phase-discriminator for deriving another two angle-indicating unidirectional signals having magnitudes respectively proportional to $\cos 4\delta_x$ and $\sin 4\delta_x$, means for applying signals from the remaining pairs of antennas in the same array in like manner to further phase-discriminators in the chain for deriving further angle-indicating unidirectional signals having magnitudes proportional to $\cos 16\delta_x$ and $\sin 16\delta_x \ldots \cos (4^{m-1}.\delta_x)$ and $\sin (4^{m-1}.\delta_x)$, a plurality of logic circuits, means for applying the unidirectional signals of each phase-discriminator to a respective logic circuit for producing in binary digital form output signals indicating in which quadrant of a Cartesian representation the incident angle terminates, whereby the phase-difference angle $\delta_x$ can be indicated by binary digit output signals from all said logic circuits, phase-discriminator means connected to the antennas of the other array for producing therefrom signals proportional to $\cos \delta_y$ and $\sin \delta_y \ldots \cos (4^{m-1}.\delta_y)$ and $\sin (4^{m-2}.\delta_y)$, and logic circuit means connected to said phase-discriminator means for producing binary digit output signals indicating the angle $\delta_y$.

4. A system as claimed in claim 3 comprising a first digital-to-analogue converter connected to said logic circuits for producing a signal $\delta_x$ of the form $kf \sin \theta$, and a second digital-to-analogue converter connected to said logic circuit means for producing a signal $\delta_y$ of the form $kf \cos \theta$.

5. A system as claimed in claim 4 comprising a cathode-ray oscilloscope having orthogonal deflection means to deflect a trace on the tube from its normal position at the centre of the tube face, and means to apply said signals $\delta_x$ and $\delta_y$ to said deflection means, the said deflection comprising a radial displacement proportional to the frequency of the incident energy concurrent with an angular displacement from a previously-determined datum direction by an angle representing the angle of incidence on the aerial arrangement of the said energy.

References Cited
UNITED STATES PATENTS

| | | | |
|---|---|---|---|
| 2,700,157 | 1/1955 | Hurvitz | 343—112 |
| 3,005,200 | 10/1961 | O'Meara | 343—113 X |
| 3,060,427 | 10/1962 | Jaffe et al. | 343—113 X |

RODNEY D. BENNETT, *Primary Examiner.*

CHESTER L. JUSTUS, *Examiner.*

B. L. RIBANDO, *Assistant Examiner.*